US012631530B2

(12) United States Patent (10) Patent No.: US 12,631,530 B2
Anderson-Smith et al. (45) Date of Patent: May 19, 2026

(54) CRYOGENIC GRINDING SYSTEM, APPARATUS, AND METHODS OF USE THEREOF

(71) Applicant: SPEX SamplePrep, LLC, Metuchen, NJ (US)

(72) Inventors: Lea L. Anderson-Smith, Marlboro, NJ (US); Marc Boivin, Wendake (CA); Jean-François Malo, Québec (CA)

(73) Assignee: SPEX SamplePrep, LLC, Metuchen, NJ (US)

( * ) Notice: Subject to any disclaimer, the term of this patent is extended or adjusted under 35 U.S.C. 154(b) by 523 days.

(21) Appl. No.: 18/177,326

(22) Filed: Mar. 2, 2023

(65) Prior Publication Data

US 2023/0358652 A1 Nov. 9, 2023

Related U.S. Application Data

(60) Provisional application No. 63/337,661, filed on May 3, 2022.

(51) Int. Cl.
| | |
|---|---|
| *G01N 1/42* | (2006.01) |
| *B02C 19/18* | (2006.01) |
| *B02C 25/00* | (2006.01) |
| *G01N 1/28* | (2006.01) |

(52) U.S. Cl.
CPC ............. *G01N 1/42* (2013.01); *B02C 19/186* (2013.01); *B02C 25/00* (2013.01); *G01N 2001/2866* (2013.01)

(58) Field of Classification Search
CPC ....... B02C 19/186; B02C 23/18; B02C 18/08; B02C 25/00; G01N 1/42; G01N 2001/2866
See application file for complete search history.

(56) References Cited

U.S. PATENT DOCUMENTS

| | | | |
|---|---|---|---|
| 3,534,914 | A | 10/1970 | Chaplenko |
| 3,734,412 | A | 5/1973 | Haas et al. |
| 3,771,729 | A | 11/1973 | Frable |
| 3,785,575 | A | 1/1974 | Langmaack et al. |

(Continued)

FOREIGN PATENT DOCUMENTS

| | | | | |
|---|---|---|---|---|
| CN | 102519773 B | 4/2014 | | |
| CN | 107029840 A | * 8/2017 | ........... | B02C 19/186 |

(Continued)

OTHER PUBLICATIONS

Translation of WO-2018164343.*
Translation of CN-107029840.*
Translation of KR-20110127305.*

*Primary Examiner* — Bobby Yeonjin Kim

(74) *Attorney, Agent, or Firm* — ArentFox Schiff LLP

(57) ABSTRACT

A cryogenic grinding system, method, and apparatus for processing a sample. The system includes a cryogen source, a containment vessel for containing the sample and the cryogen, a blade for grinding the sample, and a controller. The controller controls at least one of: a quantity of cryogen introduced into the container; a grinding duration of the at least one blade; or a grinding speed of the at least one blade based on at least one of: a user input via a grinding system input, a mass of the sample placed in the containment vessel; or a temperature within the containment vessel.

19 Claims, 13 Drawing Sheets

(56)              References Cited

U.S. PATENT DOCUMENTS

| | | | |
|---|---|---|---|
| 4,044,198 | A | 8/1977 | Kostrzewa et al. |
| 4,530,250 | A | 7/1985 | Gay et al. |
| 4,887,434 | A | 12/1989 | Pilwat et al. |
| 5,363,746 | A | 11/1994 | Gordon |
| 5,513,809 | A | 5/1996 | Perkel |
| 5,644,923 | A | 7/1997 | Moro-Franco |
| 5,658,463 | A | 8/1997 | Rubio |
| 6,170,269 | B1 | 1/2001 | Wisniewski |
| 7,823,818 | B2 | 11/2010 | Stitt et al. |
| 7,954,741 | B2 | 6/2011 | Kunc et al. |
| 8,062,610 | B2 | 11/2011 | Gullett et al. |
| 8,074,906 | B2 | 12/2011 | Talton |
| 8,272,255 | B2 | 9/2012 | Halverson et al. |
| 8,348,183 | B2 | 1/2013 | Mertens et al. |
| 8,720,806 | B2 | 5/2014 | Mahler |
| 9,044,758 | B2 | 6/2015 | Niwa et al. |
| 9,243,984 | B2 | 1/2016 | Baer et al. |
| 9,943,854 | B1 | 4/2018 | Melnyk et al. |
| 10,040,123 | B2 | 8/2018 | Rengarajan et al. |
| 10,139,317 | B2 | 11/2018 | Logue |
| 2009/0053375 | A1 | 2/2009 | Johnson |
| 2009/0194616 | A1 | 8/2009 | Hiew et al. |
| 2014/0314922 | A1 | 10/2014 | Meduri et al. |
| 2018/0250682 | A1 | 9/2018 | Palmer et al. |

FOREIGN PATENT DOCUMENTS

| | | | | |
|---|---|---|---|---|
| CN | 107350026 | A | 11/2017 | |
| CN | 108850848 | A | 11/2018 | |
| CN | 113751158 | A | 12/2021 | |
| DE | 102019007404 | A1 | 4/2021 | |
| KR | 20110127305 | A * | 11/2011 | ............. B65B 31/02 |
| WO | WO-2018164343 | A1 * | 9/2018 | ........... B65B 31/025 |

* cited by examiner

2000

2100

2143

2146

2144

2145

2142

2160

Network

CRYOGENIC GRINDING SYSTEM, APPARATUS, AND METHODS OF USE THEREOF

CROSS REFERENCE TO RELATED APPLICATIONS

The present application claims priority to U.S. Provisional Application No. 63/337,661 entitled "CRYOGENIC GRINDING SYSTEM, APPARATUS, AND METHODS OF USE THEREOF," filed May 3, 2022, which is hereby incorporated by reference in the entirety.

INTRODUCTION

The present disclosure generally relates cryogenic grinding or milling apparatuses, particularly to a cryogenic grinding system.

BACKGROUND

Cryogenic grinding or milling or is often used to reduce a sample down to a particle size suitable for analysis. Cryogenic milling or grinding often involves cooling or otherwise removing heat from a sample to allow a sample to be ground to a smaller particle size for further analysis. However, in the past, the systems and methods used for cryogenic grinding or milling often required a large number of tedious steps by a technician. In addition, past systems and methods often required trial-and-error to accomplish adequate sample processing which resulted in waste of both samples that needed to be processed in addition to a waste of energy and material (e.g., cryogen). The current disclosure overcomes these drawbacks by providing a reliable and efficient method of processing samples via cryogenic grinding.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In some aspects, the system described herein relates to a cryogenic grinding system for processing a sample, the system including: a cryogen source; a containment vessel for containing the sample and the cryogen; a blade for grinding the sample; and a controller configured to control at least one of: a quantity of cryogen introduced into the container; a grinding duration of the at least one blade; or a grinding speed of the at least one blade based on at least one of: a user input via a grinding system input, a mass of the sample placed in the containment vessel; or a temperature within the containment vessel.

In some aspects, the apparatus described herein relates to a cryogenic grinding apparatus for processing a sample, the apparatus including: a cryogen supply valve; an opening configured to receive a containment vessel for containing the sample; a blade driving apparatus; and a controller configured to control at least one of: a quantity of cryogen introduced into a vessel received within the opening;

a rotating duration of the blade driving apparatus; a speed of the of the blade driving apparatus based on at least one of: a user input via a grinding system input, a detected mass of the sample in a containment vessel placed in the opening; or a temperature within the containment vessel placed in the opening.

In some aspects, the apparatus described herein relates to a cryogenic grinding apparatus for processing a sample within a containment vessel, the apparatus including: an opening configured to receive the containment vessel; and an engagement system, wherein when the containment vessel is placed into the opening, the engagement system is configured to engage at least one of: a driving coupler with a blade driving coupler of the containment vessel; a cryogen supply with a cryogen supply port of the containment vessel; or an exhaust duct with an exhaust port of the containment vessel.

These and other aspects of the invention will become more fully understood upon a review of the detailed description, which follows.

BRIEF DESCRIPTION OF THE DRAWINGS

Figure 13:
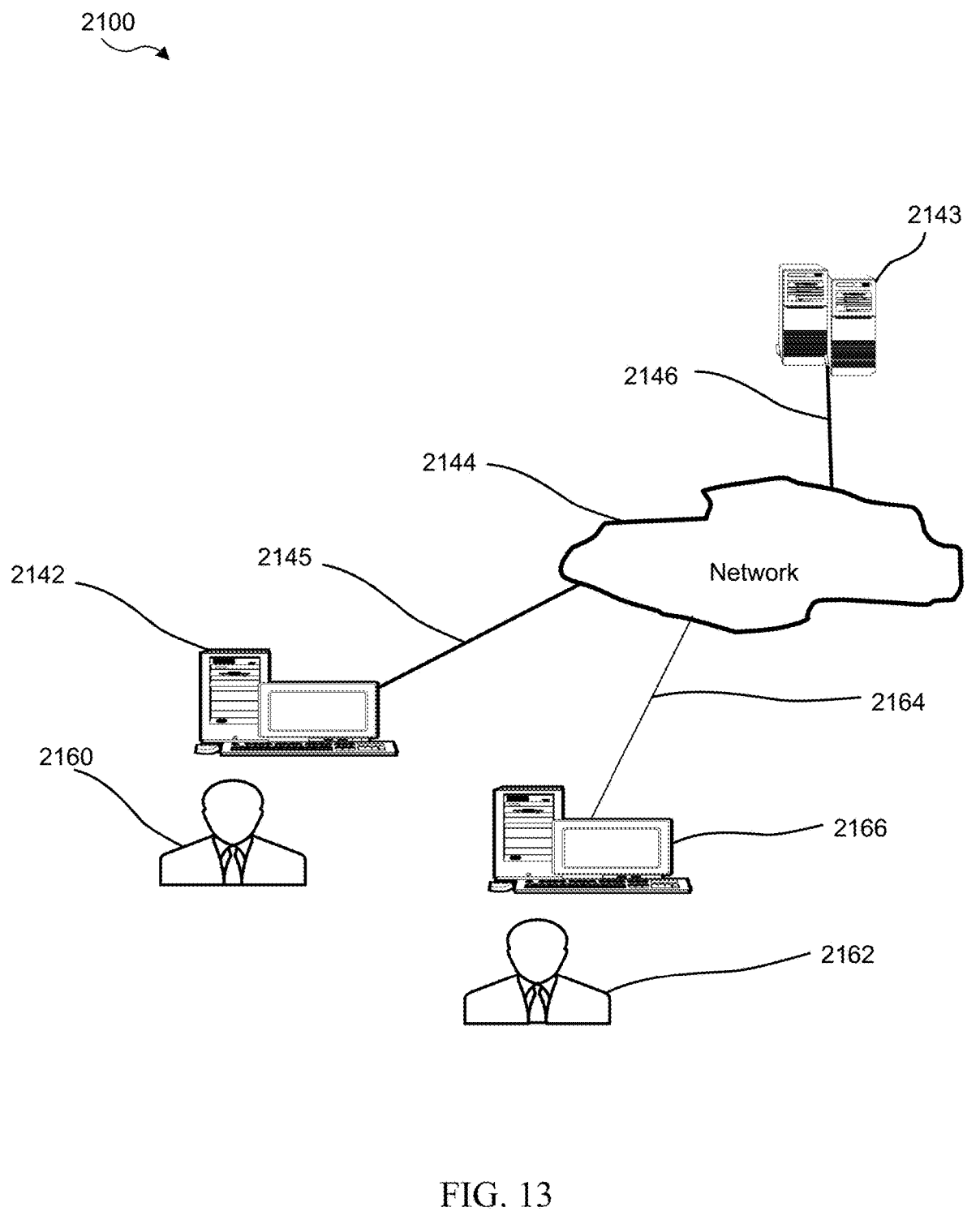

FIG. 13 illustrates an example of various system components in accordance with aspects of the present disclosure.

DETAILED DESCRIPTION

Figures 1A, 1B:
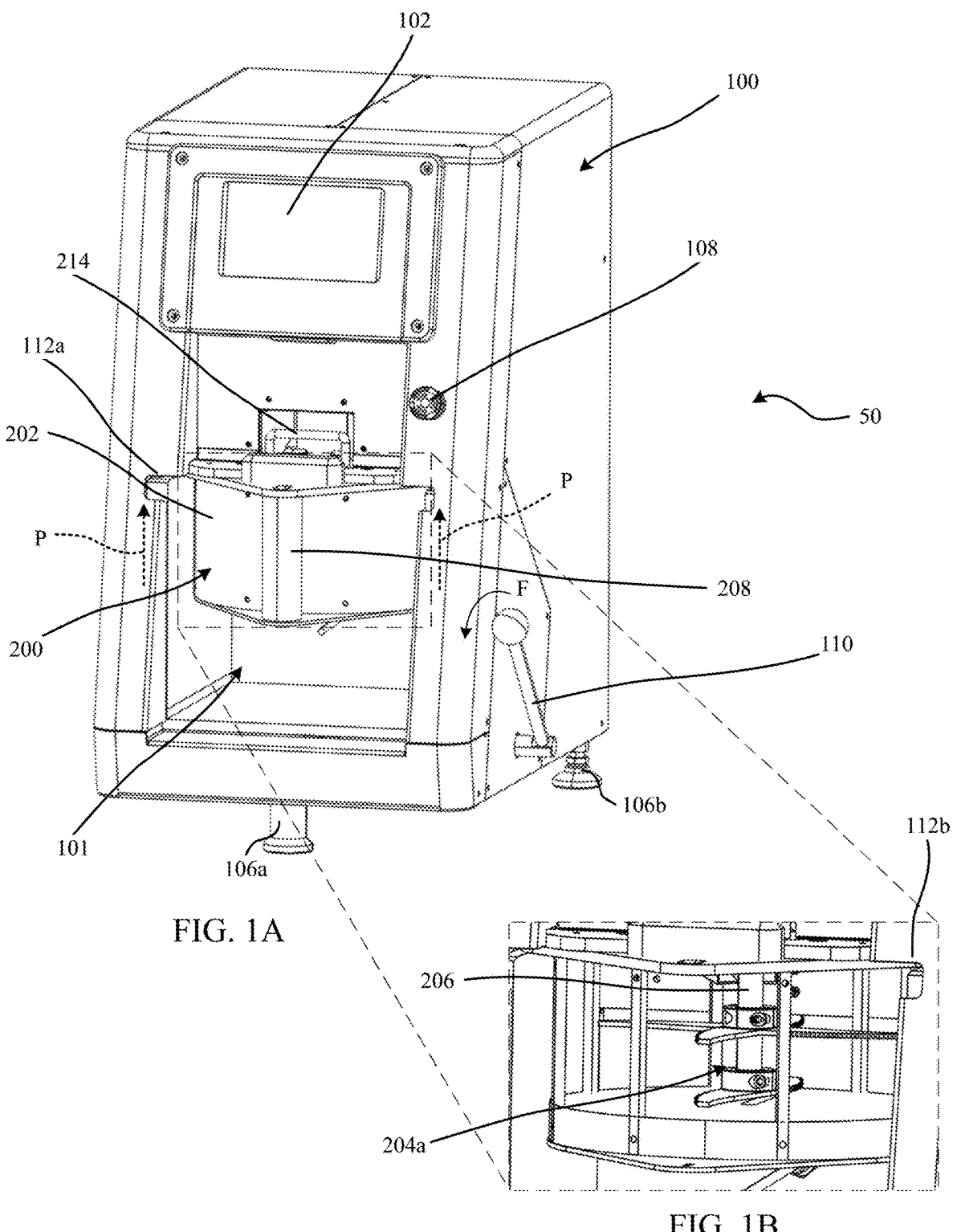
FIG. 1A is perspective view of an example cryogenic grinding system with a sample containment vessel placed therein.
FIG. 1B is a close up partial cut-away view of the sample containment vessel according to aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

I. Terminology

Throughout the disclosure, the terms substantially or approximately may be used as a modifier for a geometric relationship between elements or for the shape of an element or component. While the terms substantially or approximately are not limited to a specific variation and may cover any variation that is understood by one of ordinary skill in the art to be an acceptable variation, some examples are provided as follows. In one example, the term substantially or approximately may include a variation of less than 10% of the dimension of the object or component. In another example, the term substantially or approximately may include a variation of less than 5% of the object or component. If the term substantially or approximately is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the system and apparatus described herein is installed in an in-use orientation. Further, in order to provide context to the current disclosure, a broad overview of the discovered deficiencies of various systems and an example implementation of the current disclosure and the advantages provided by the disclosure are described below. Further details of example implementations of the current disclosure are described in detail with reference to the figures below.

Terms such as a, an, and the are not intended to refer to only a singular entity, but include the general class of which a specific example may be used for illustration. The terms a, an, and the may be used interchangeably with the term at least one. The phrases at least one of and comprises at least one of followed by a list refers to any one of the items in the list and any combination of two or more items in the list. All numerical ranges are inclusive of their endpoints and non-integral values between the endpoints unless otherwise stated.

The terms first, second, third, and fourth, among other numeric values, may be used in this disclosure. It will be understood that, unless otherwise noted, those terms are used in their relative sense only. In particular, in some aspects certain components may be present in interchangeable and/or identical multiples (e.g., pairs). For these components, the designation of first, second, third, and/or fourth may be applied to the components merely as a matter of convenience in the description of one or more of the aspects of the disclosure.

The term controller or processor as used herein, may refer to a device that processes signals and performs general computing and arithmetic functions. Signals processed by the processor may include digital signals, data signals, computer instructions, processor instructions, messages, a bit, a bit stream, or other computing that can be received, transmitted and/or detected. A processor, for example, may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term memory, as used herein, may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term operable connection, or signal communication as used herein, may include a coupling by which entities are capable of exchanging information or providing and receiving current, in which signals, physical communications, and/or logical communications may be transmitted and/or received. An operable connection may include a physical interface, a data interface and/or an electrical interface. The term operable connection may also include a physical connection (either directly or indirectly) between one or more mechanically operable components or devices.

For context, an overview is provided of aspects of the disclosure and the advantages the disclosure provides. This overview, and the detailed description that follows, has been presented for purposes of illustration and description. It is not intended to be exhaustive nor to limit the disclosure to the forms described. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

II. Overview

As described in further detail below, aspects of the disclosure relate to an improved cryogenic milling system, apparatus, and method. The cryogenic milling system includes a main body and a sample containment vessel having one or more blades therein. After a sample is placed within the sample containment vessel, and the vessel is placed within the main body, a cryogen is supplied to the container to remove heat from the sample. The blade within the container is rotated, which results in the sample being reduced to a size that is suitable for further analysis. Details examples of the disclosed system, apparatus, and method are provided in below.

III. Detailed Examples

Figure 2:
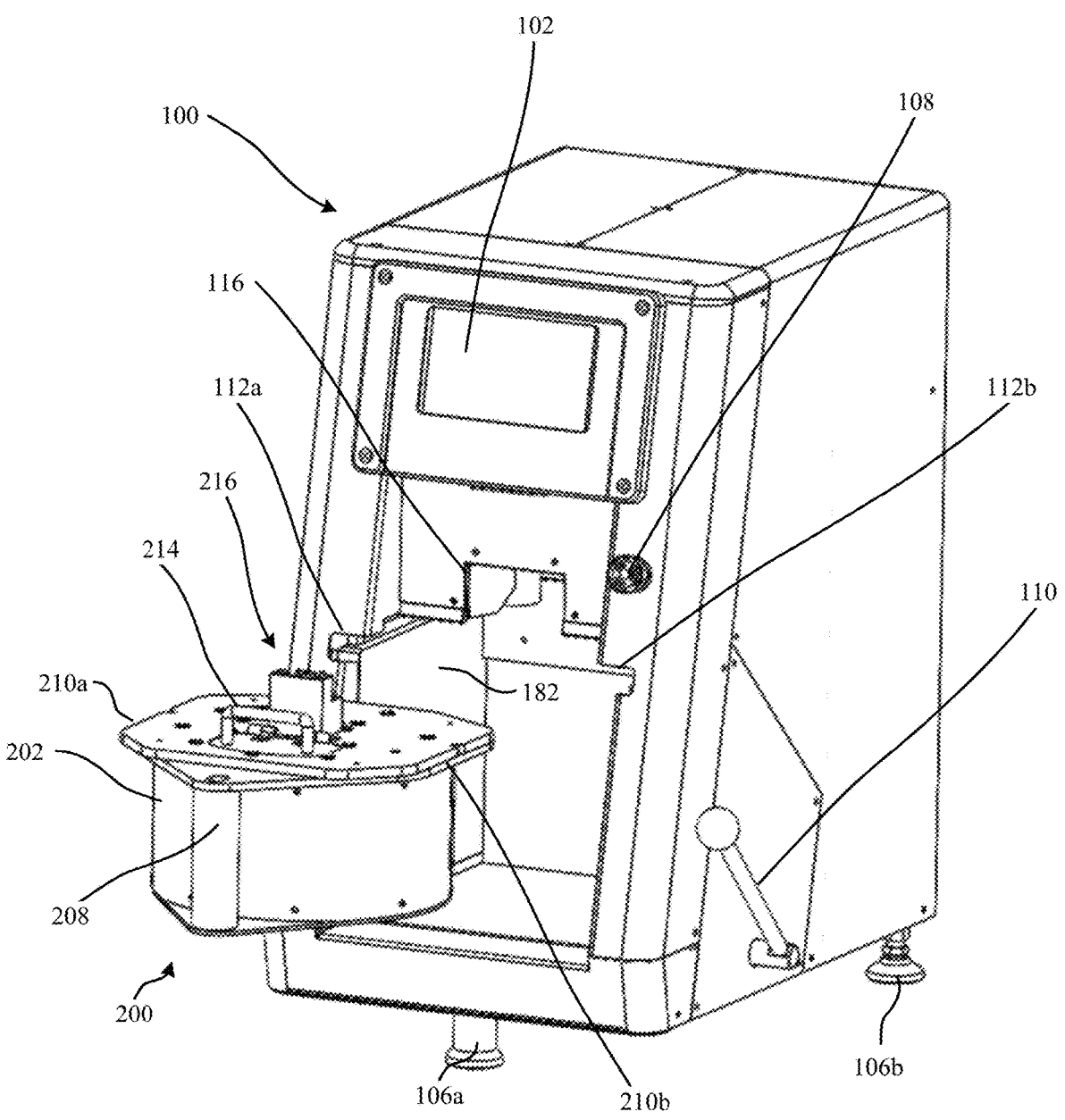
FIG. 2 is a perspective view of the example cryogenic grinding system of FIG. 1A with the sample containment vessel removed and outside of the main body.

FIGS. 1-2 illustrates a perspective view of an example cryogenic grinding system 50 with an example main body 100, which is configured to removably receive a sample containment vessel 200. FIG. 1B shows one example of the cryogenic grinding system with the sample containment vessel 200 placed within the opening 101 of the main body 100. FIG. 2 shows an example of the cryogenic grinding system 50 with the sample containment vessel 200 removed from the opening 101 of the main body 100.

FIG. 1B is a partial view of the sample containment vessel 200 with a portion of the outer wall (e.g., wall 202) removed to show one example blade configuration 204 inside the vessel 200. While two blades are shown in FIG. 1B, it is noted that the containment vessel 200 may instead have a single blade (e.g., as described below with respect to FIG. 4B). In another example, the vessel may instead have more than two blades (e.g., 3 blades, 4 blades, 5 blades) in another example configuration. The containment vessel 200 may for example be receivable into the main body 100 via a series of tracks 112a and 112b that are configured to slidably receive rails 210a and 210b of the sample containment vessel 200. Once the sample containment vessel 200 is slid into the main body 100 as shown in in FIG. 1A, an engagement lever 110 may be rotated (e.g., in direction F shown in FIG. 1A) causing the containment vessel 200 to be engaged with or otherwise retainability held within an opening 101 of the main body 100. In one example, rotating the engagement lever 110 in direction F may cause one or more pressing members (described in further detail below) to press upward in an F direction (See FIG. 1A), the pressing members may press upward, thus pressing the rails 210a and 210b against the top of each respective track 112a and 112b of the main body 100 and applying a clamping force to the sample containment vessel 200.

As described in further detail below, once a user slides the sample containment vessel 200 into the opening 101 of the main body 100, and the engagement lever 110 is rotated in direction F, various connections (e.g., a cryogen source connection, an exhaust connection, and/or a temperature sensor or sensor electrical contact) and/or a blade driving source connection may engage so that a sample contained within the sample containment vessel 200 may be further processed by the cryogenic grinding system 50. The main body 100 may further include a display interface 102, which may for example be display and touchscreen for controlling the cryogenic grinding system 50. In one example, the display interface 102 may for example be display and touchscreen with a graphical user interface (GUI) that include displayed buttons or other GUI interface elements that allow a user to control the cryogenic grinding system 50. The main body 100 may further include a stop-button 108 which immediately stops the cryogenic grinding system when pressed. In one example, the stop-button 108 may for example be an emergency stop button for stopping the system in case of malfunction or in case a user incorrectly operates the system. The main body 100 further includes a series of feet 106a-106c. In one example, any one or more of the feet 106a-106c may be mass-cells or any other type of mass sensor for determining the weight of the sample in the sample containment vessel 200 and/or the weight of the cryogen supplied to or contained within sample containment vessel 200. In the example shown in FIG. 1A, a front foot 106a is shown as a mass-cell. The mass-cell may provide an output or resistance indicating the weight or mass of any one or a combination of the sample in the sample containment vessel 200 and/or the weight of the cryogen supplied to or contained within sample containment vessel 200.

As an alternative to the aforementioned display interface and/or the described automated and/or semi-automated control, the cryogenic grinding system 50 may instead be manually or analog controlled. For example, any one or a combination of a quantity of cryogen introduced into the container; a grinding duration of the at least one blade; or a grinding speed of the at least one blade may be controlled via any one or a combination of a switch, lever, or dial. Further, the system may provide feedback via any one or a combination of indicator lights, lcd screen(s), and/or audible indicators.

Turning to FIGS. 1A and 1B, the sample containment vessel 200 may for example include a handle 208 and may have an outer wall 202. The sample containment vessel 200 may further include an inner wall (e.g., inner wall 252 in FIG. 4A, and may for example have an insulating material, gas, fluid, or may be evacuated so a vacuum is present between the outer wall 202 and inner wall 252 to insulate the sample and/or cryogen provided to the sample containment vessel 200 from the ambient environment.

As shown in FIG. 2, the sample containment vessel 200. May include a blade driving arrangement 216 which may be configured to be received by a blade driving opening 116 of the main body 100 when the sample containment vessel 200 is slid into the opening 101 by a user. Additional details of the blade driving arrangement 216 are described in further detail below.

Figure 3A:
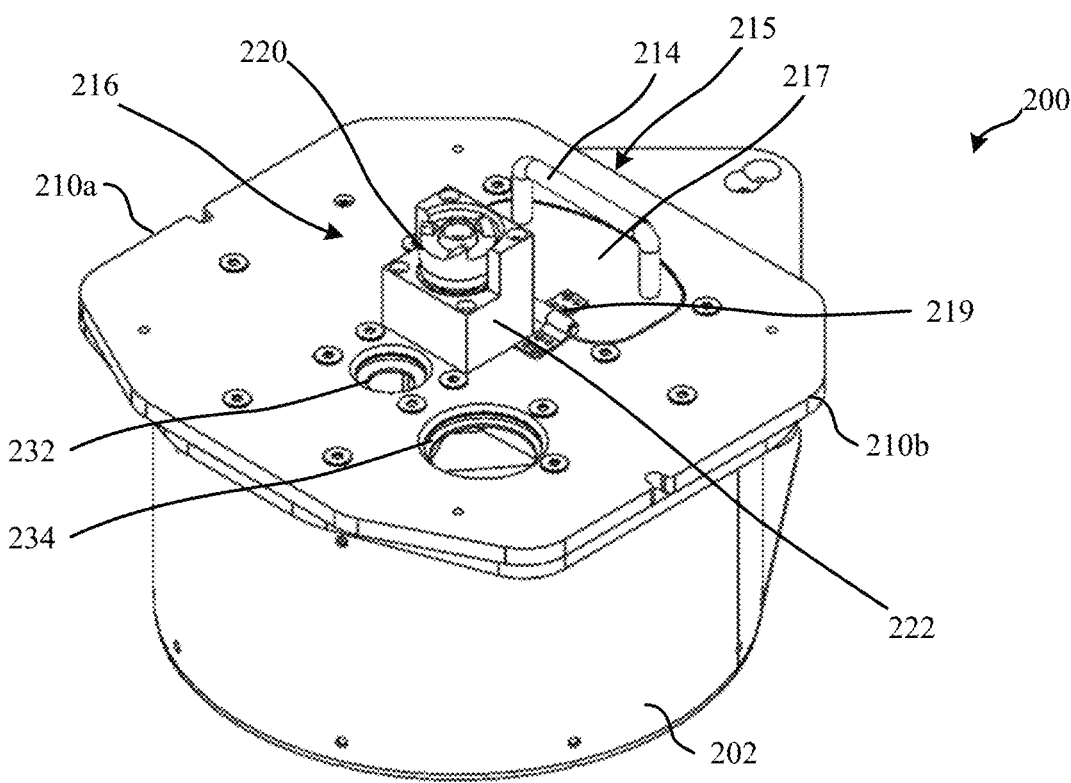
FIG. 3A is a rear perspective view of one example of a sample containment vessel 200 according to aspects of the disclosure.
Figure 3B:
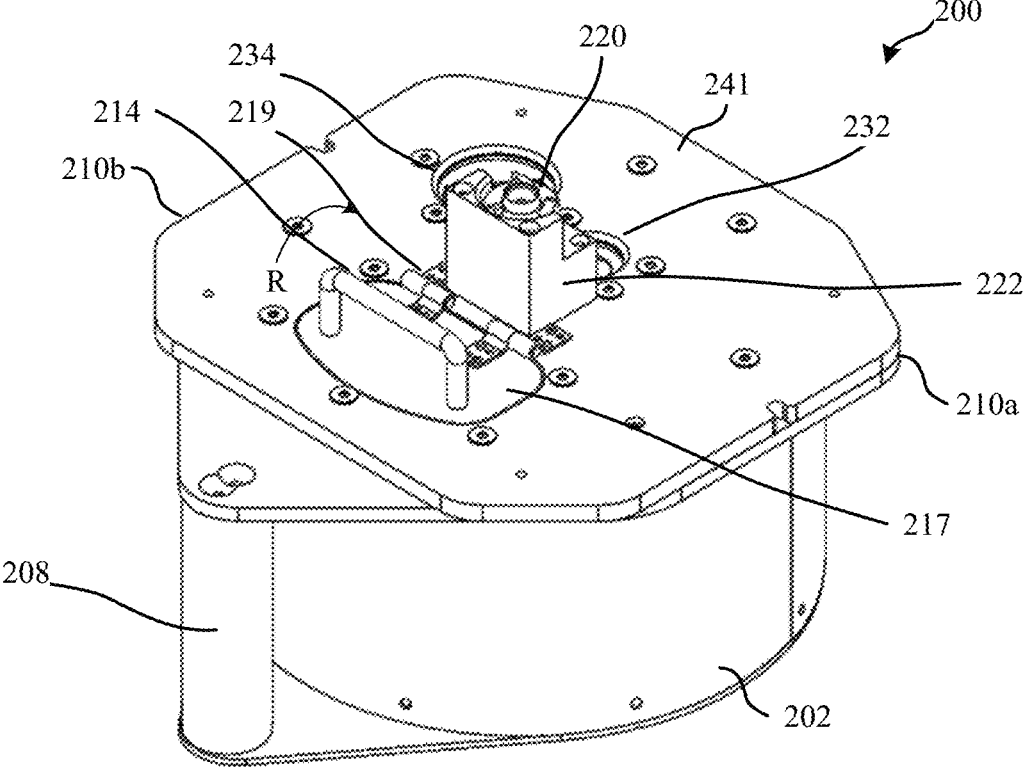
FIG. 3B is a front perspective view of the sample containment vessel of FIG. 3A.

The sample containment vessel 200 may further include a sample supply opening with a handle 214. FIGS. 3A and 3B show views of a sample containment vessel 200 that may be analogous with the sample containment vessel 200 shown in FIGS. 1-2. The handle 214 may be connected to a supply door 217 which may be pivotally connected to a lid 240 of the sample containment vessel 200. As noted above, the supply door 217 may be pivotally connected to the supply door 217, allowing a user to pivot the supply door 217 generally in direction R (FIG. 3B) so the sample can be provided to the sample containment vessel 200. Once the sample is provided to the sample containment vessel 200, the supply door 217 may be closed. Installation of the sample containment vessel 200 into the opening 101 of the main body 100 and rotation of the engagement lever 110 may cause a downward or sealing force to be applied to the supply door 217 and/or the handle 214. As mentioned above and as described in further detail below, one or more clamping members may provide an upward force (e.g., in direction P shown in FIG. 1A) to tracks 112a and tracks 112b. The aforementioned upward force may cause the supply door 217 and/or the handle 214 to be pressed against a corresponding surface within the blade driving opening 116, thus causing the supply door 217 to be pressed downward and sealing, minimizing and/or preventing the escape of gas, liquid, or a sample that is placed within the sample containment vessel 200 from escaping during processing. Either one of or both of the supply door 217 and a supply opening of the sample containment vessel 200 may have gasket(s) or seals to further improve the sealing interface between the supply door 217 and corresponding opening. The gasket(s) or seals may include any appropriate sealing interface known in the art.

Figure 4A:
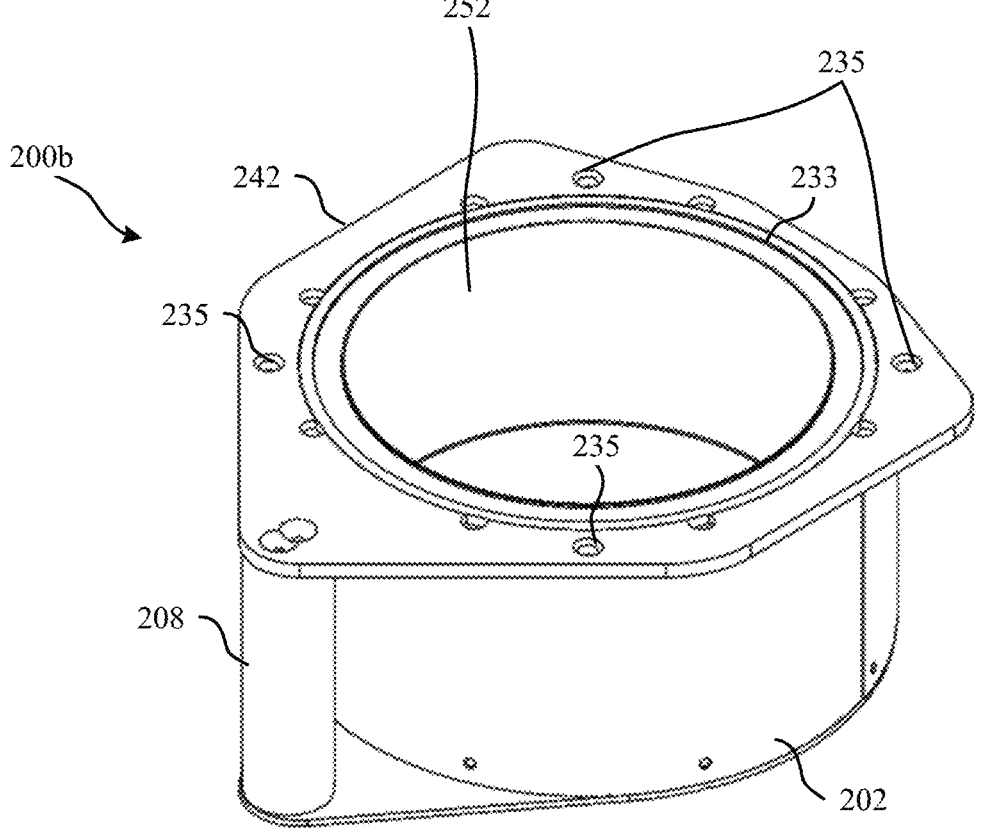
FIG. 4A is a front perspective view of the sample containment vessel of FIGS. 3A and 3B with the top section removed therefrom.
Figure 4B:
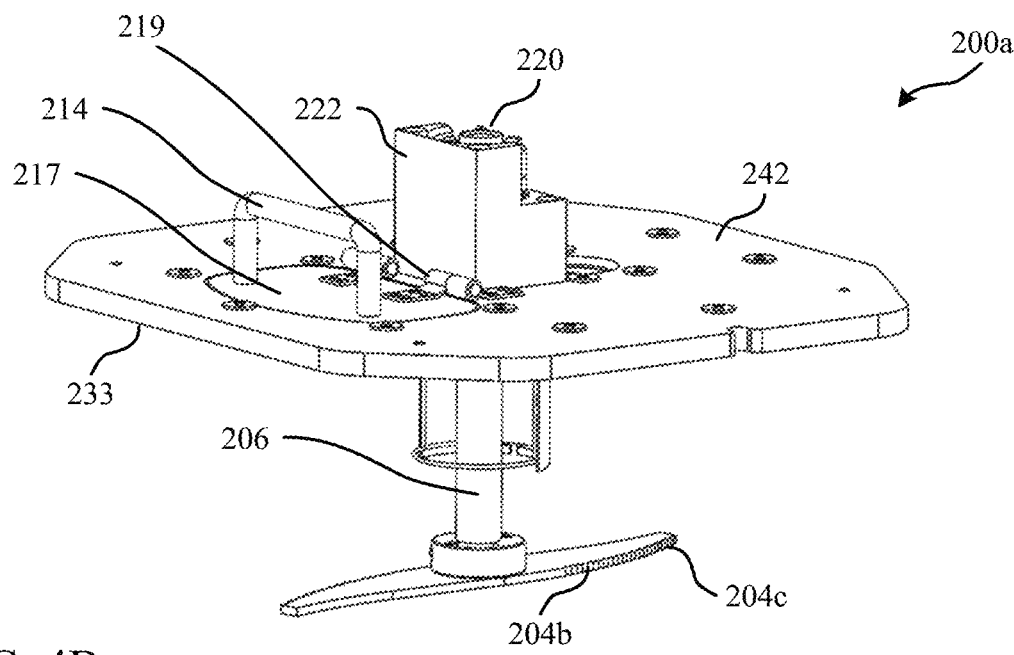
FIG. 4B is a front-top perspective view of the top section of the sample containment vessel of FIGS. 3A and 3B.
Figures 5A, 5B:
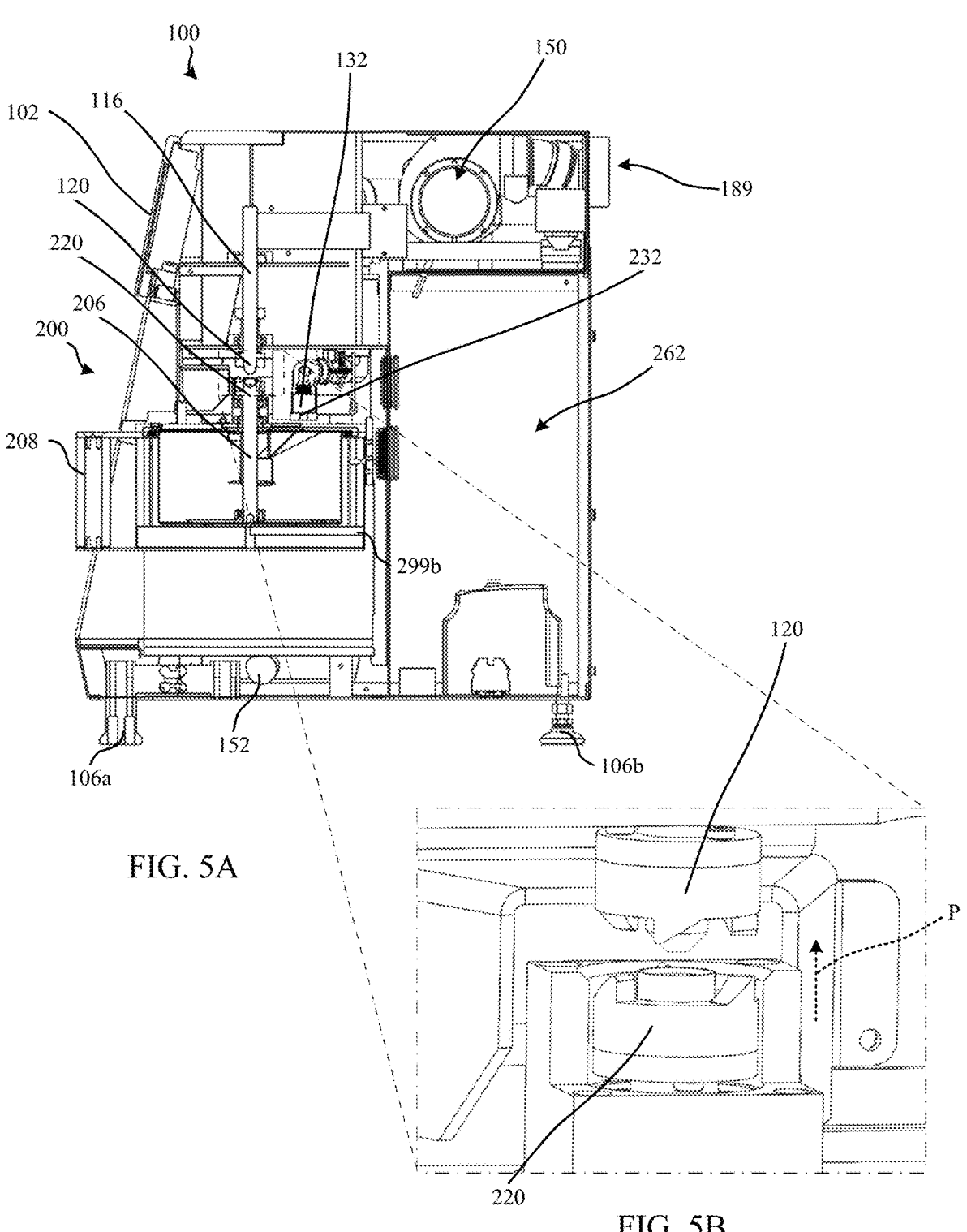
FIG. 5A is a left-side cross-section view of a cryogenic milling apparatus according to aspects of the disclosure.
FIG. 5B is close-up view of a blade driving coupler and driving coupler in a separated state.
Figures 6A, 6B:
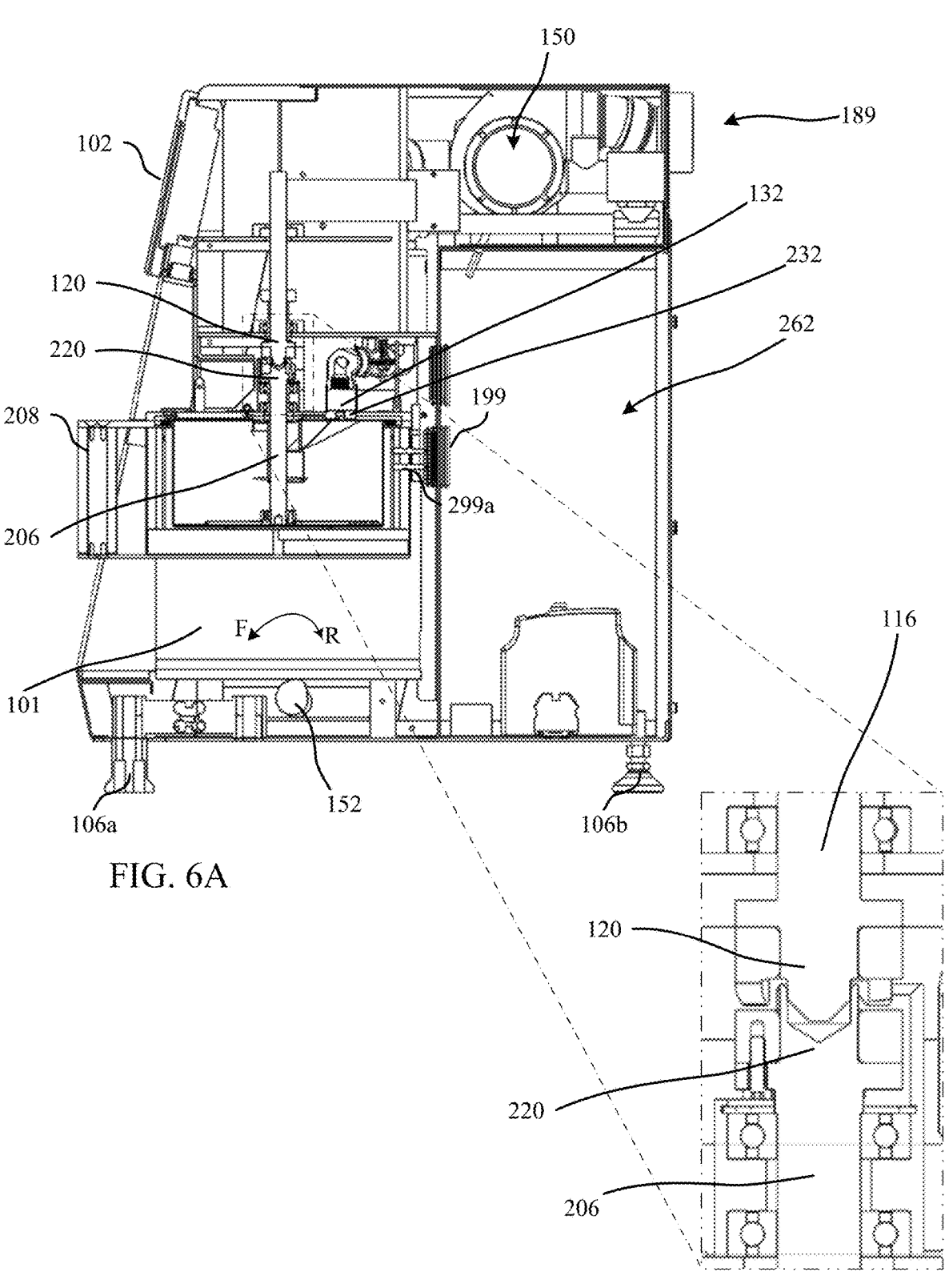
FIG. 6A is a left-side cross-section view of a cryogenic milling apparatus according to aspects of the disclosure.
FIG. 6B is close-up view of a blade driving coupler and driving coupler in an engaged state.

FIGS. 3A and 3B show examples of the sample containment vessel 200 removed from the main body 1000. FIGS. 4A and 4B show examples of the sample containment vessel 200 with a top section 200a separated from a bottom section 200b. As shown in FIGS. 3A and 3B, the sample containment vessel 200 may further include a blade driving support portion 222 and a blade driving coupler 220, as part of the blade driving arrangement 216. As best shown in the cross-sectional view of FIGS. 5A and 6A, the blade driving support portion 222 may for example include one or more bearings or bushings for rotatably supporting the blade shaft 206. The blade driving coupler 220. May for example be connected to or otherwise configured to provide a rotational force to the blade shaft 206. The blade driving coupler 220 may for example include a series of engagement teeth as shown in FIG. 5B, the engagement teeth may be configured to engage with and simultaneously rotate with a driving coupler 120 of the main body 100. As best shown in FIGS. 5B and 6B, the blade driving coupler 220 and driving coupler 120 may be configured to engageably couple when the engagement lever 110 is pulled in direction F (FIG. 1A) by the user, which causes the blade driving coupler 220 to move in direction P (FIG. 5B). FIG. 5B shows an example of the blade driving coupler 220 and driving coupler 120 in the separated position (e.g., to allow for installation or removal of the sample containment vessel 200 into the main body 100. FIG. 6B shows an example of the blade driving coupler 220 and the driving coupler 120 in the engaged position (e.g., to transfer a rotational force provided by a motor to the blade driving coupler 220). One example of a motor is shown as reference 172 in FIG. 8.

FIGS. 3A and 3B show one example of an exhaust port 234 and a cryogen supply port 232. The cryogen supply port 232 may be configured to be placed in fluid communication with a cryogen supply of the main body 100 (e.g., cryogen supply 132 in FIGS. 5A, 6A, and 7). As shown in the example of FIGS. 3A and 3B, the cryogen supply port 232 may for example have a recess encompassing an opening. The recess may for example improve a sealing surface area between the cryogen supply port 232 and a cryogen supply of the main body 100. Either one of or both of the cryogen supply port 232 and the cryogen supply 132 in FIGS. 5A, 6A, and 7 may have gasket(s) or seals to further improve the sealing interface between the cryogen supply port 232 and the cryogen supply 132. The gasket(s) or seals may include any appropriate sealing interface known in the art. The cryogen supply port 232 and the cryogen supply 132 may be configured to be spaced from one another when the sample containment vessel 200 is first slid into the main body 100. Once the sample containment vessel 200 is fully slid into the main body 100, and the engagement lever 110 is pulled in direction F, the cryogen supply port 232 and the cryogen supply 132 may be moved into engagement (e.g., in direction P) causing a seal or partial seal and allowing for fluid communication between the cryogen supply port 232 and the cryogen supply 132.

Figure 8:
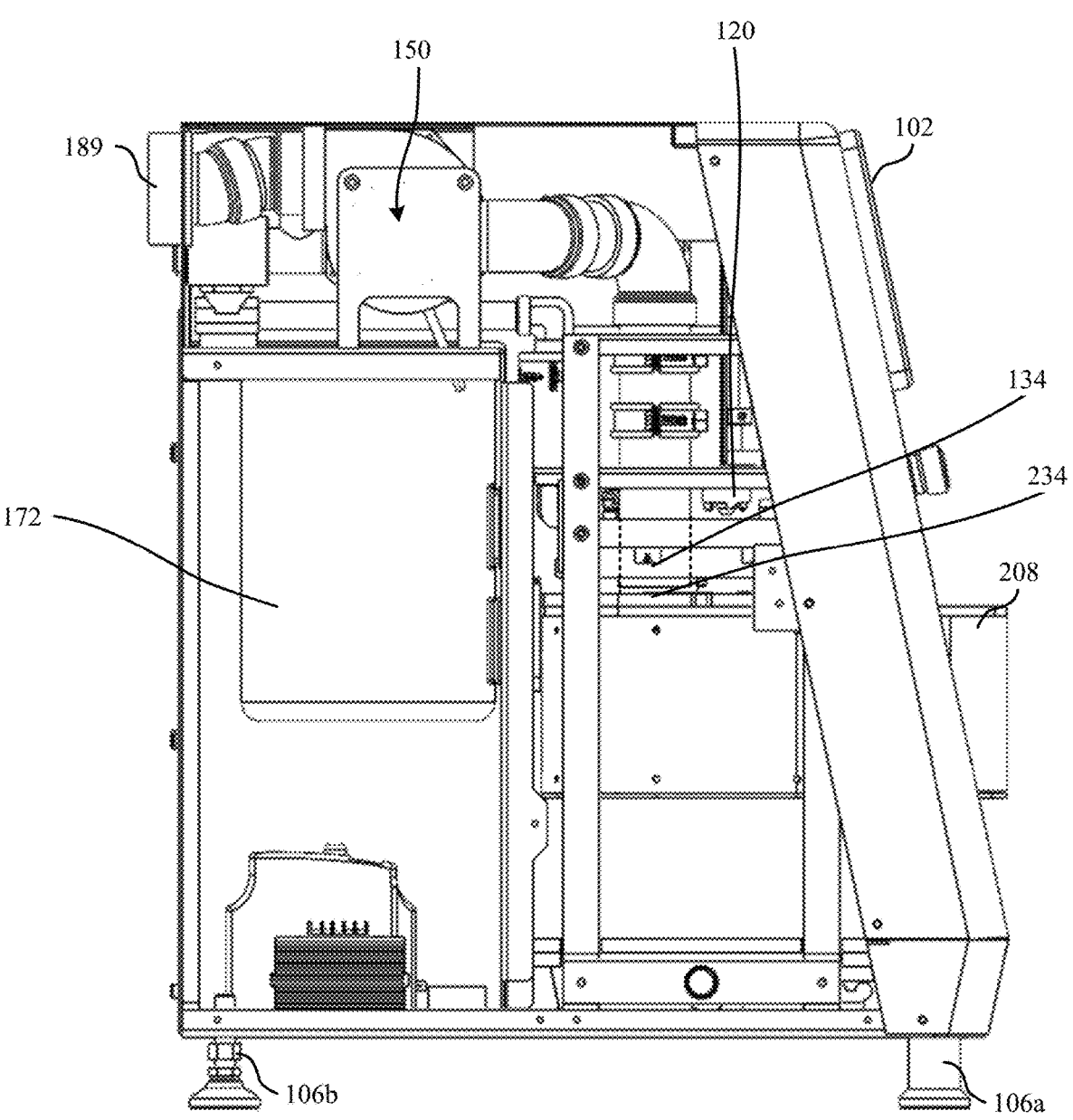
FIG. 8 is a left-side cross-section view of a cryogenic milling apparatus according to aspects of the disclosure.

The exhaust port 234 of the sample containment vessel 200 may be configured to be placed in fluid communication with an exhaust duct of the main body 100 (e.g., exhaust duct 134 in FIG. 8). As shown in the example of FIGS. 3A and 3B, the exhaust port 234 may for example have a recess encompassing an opening. The recess may for example improve a sealing surface area between the exhaust port 234 and an exhaust duct interface of the main body 100. Either one of or both of the exhaust port 234 and the exhaust duct interface may have gasket(s) or seals to further improve the sealing interface between the exhaust port 234 and the exhaust duct 134. The gasket(s) or seals may include any appropriate sealing interface known in the art. The exhaust port 234 and the exhaust duct 134 may be configured to be spaced from one another when the sample containment vessel 200 is first slid into the main body 100. Once the sample containment vessel 200 is fully slid into the main body 100, and the engagement lever 110 is pulled in direction F, the exhaust port 234 and the exhaust duct 134 may be moved into engagement (e.g., in direction P) causing a seal or partial seal allowing for fluid communication between the exhaust port 234 and the exhaust duct 134.

FIGS. 4A and 4B show examples of the sample containment vessel 200 with the top section 200a separated from a bottom section 200b. The top section 200a may for example include the supply door 217 and optionally the handle 214 hingedly coupled thereto via a hinge 219. The top section 200a may further include the blade driving support portion 222 and the blade driving coupler 220 with a blade shaft 206 rotatably mounted to the top section 200a via one or more bearings and/or bushings. The blade driving support portion 222 may further include a seal, gasket, or o-ring configured to prevent a fluid from escaping from the sample containment vessel 200 via the interface between the top section 200a and the rotatable blade shaft 206. In one example, the seal, gasket, or o-ring may comprise Teflon™ (Polytetrafluoroethylene). As shown in FIG. 4B, the blade shaft 206 may for example have one or more blades 204a connected thereto. While only a single blade is shown in FIG. 4B, it is noted that any number of blades may be present as allowed for by the space constraints of the sample containment vessel 200. For example, as shown in the example of FIG. 1B, the blade shaft 206 may instead have two blades mounted thereto. The blade or blade(s) may be formed of a rigid material such as steel or stainless steel and may be hardened or otherwise treated to increase strength or rigidity of the blade, especially at the contact leading edges 204c of the blade 204b. In one example, the leading edges 204c of the blade(s) may be sharpened and/or may include a series of ridges or other patterned or randomized surface irregularities that may further improve the efficiency at which the blade is able to reduce a sample. In some examples, the blade may be replaceably connected to blade shaft 206 to allow a user to replace or otherwise service the blade. In one example, the blade 204b may be threaded onto the shaft 206 or may be held to the shaft via a bolt that is threaded into a the bottom of the blade shaft 206.

The top section 200a is configured to be mounted to the bottom section 200b. The bottom section 200b may include an outer wall 202 and inner wall 252, a handle 208, and a sealing channel or interface 233. In one aspect the sealing channel or interface may be configures to receive a gasket or seal such as an o-ring. In one example, the top section 200a and bottom section 200b may be sealed using a Teflon™ (Polytetrafluoroethylene) seal, gasket or o-ring, at either one of or both of the top section 200a and/or bottom section 200b for example. For example, the top section 200a may for example have a top section seal 236. The top section seal 236 may comprise a Teflon™ (Polytetrafluoroethylene) seal, gasket or o-ring. While the example described includes one or more Teflon™ gaskets, it is noted that the gasket(s) or seals may include any appropriate sealing interface known in the art.

Figure 4C:
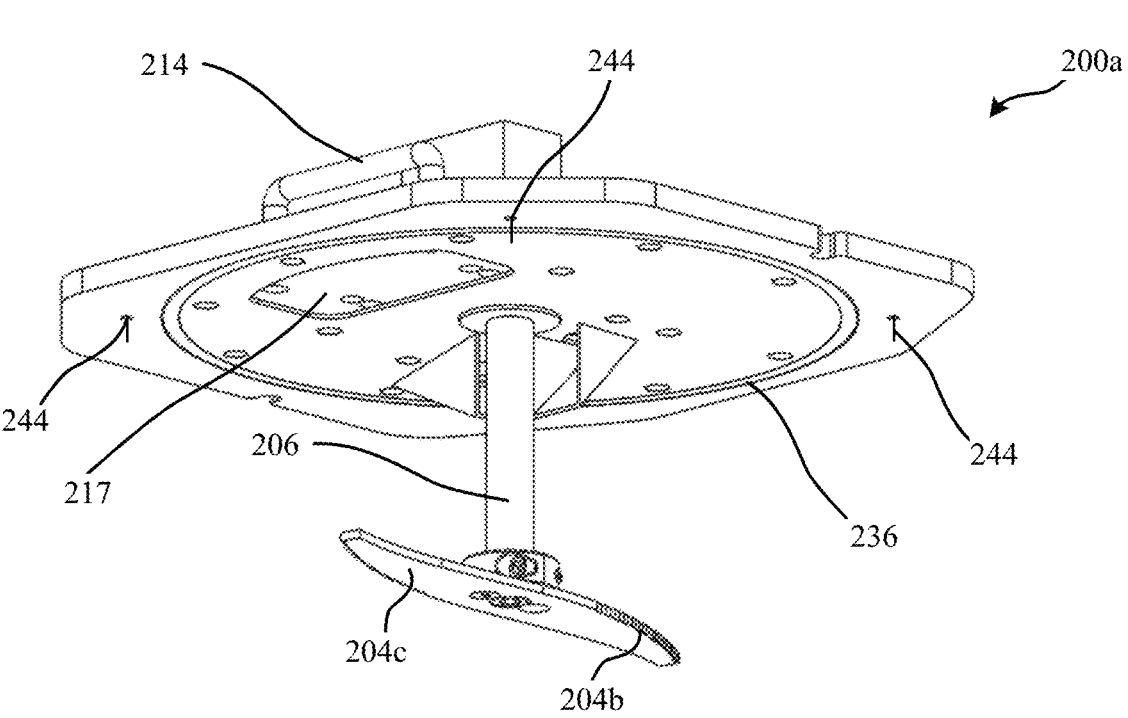
FIG. 4C is a front-bottom perspective view of the top section of the sample containment vessel of FIG. 4b.

As shown in FIG. 4C, the top section 200a may for example have a series of studs or protrusions 244 (FIG. 4C) that are configured to be received by a corresponding receiving openings 235 of the bottom section 200b to align the top section 200a with the bottom section 200b. Installation of the sample containment vessel 200 into the opening 101 of the main body 100 and rotation of the engagement lever 110 may cause a downward or sealing force to be applied to the top section 200*a* and/or the bottom section 200*b*. As mentioned above and as described in further detail below, one or more clamping members may provide an upward force (e.g., in direction P shown in FIG. 1A) to tracks 112*a* and tracks 112*b*. The aforementioned upward force may cause the top section 200*a* to be pressed against the bottom section 200*b*, thus causing the top section 200*a* to be pressed downward and sealing, minimizing and/or preventing the escape of gas, liquid, or a sample that is placed within the sample containment vessel 200 from escaping during processing. Once the engagement 110 is rotated to the release position, the top section 200*a* may be separated from the bottom section 200*b* to remove a sample, and/or to clean or reprocesses and/or refurbish the sample containment vessel 200, for example.

It is further noted that while the studs or protrusions 244 are shown as located on the top section 200*a* in FIG. 4C, the studs or protrusions 244 may instead be at the bottom section 200*b* and the receiving openings may be at the top section 200*a* as an alternative. Further, other methods of aligning the top section 200*a* with the bottom section 200*b* may be implemented. For example, the top section 200*a* may for example have a cylindrical-shaped protrusion configured to fit-into opening of the bottom section 200*b*.

In another example, the bottom section 200*b* may further include a series of threaded fastener receiving openings (e.g., reference 234 in FIG. 4A) at a flange 242. It is noted that while only three fastener receiving openings 235 are referenced and twelve total are shown in FIG. 4A, any number of threaded fastener receiving openings may be implemented. The threaded fastener receiving openings may be configured and located on the flange 242 so as to align with corresponding through holes in the top section 200*a*. For example, the top section 200*a* may include a series of through holes positioned to align with the threaded fastener receiving openings in the bottom section 200*b*. To seal and affix the top section 200*a* to the bottom section 200*b*, a series of fasteners, such as bolts may be passed through the series of through holes of the top section 200*a* and threaded into the fastener receiving openings in the bottom section 200*b* and appropriately tightened. The top section 200*a* may be separated from bottom section 200*b* by reversing the aforementioned process. The top section 200*a* may be separated from the bottom section 200*b* to add a sample to the sample containment vessel 200, remove a sample, and/or to clean or reprocesses and/or refurbish the sample containment vessel 200, for example.

Figure 7:
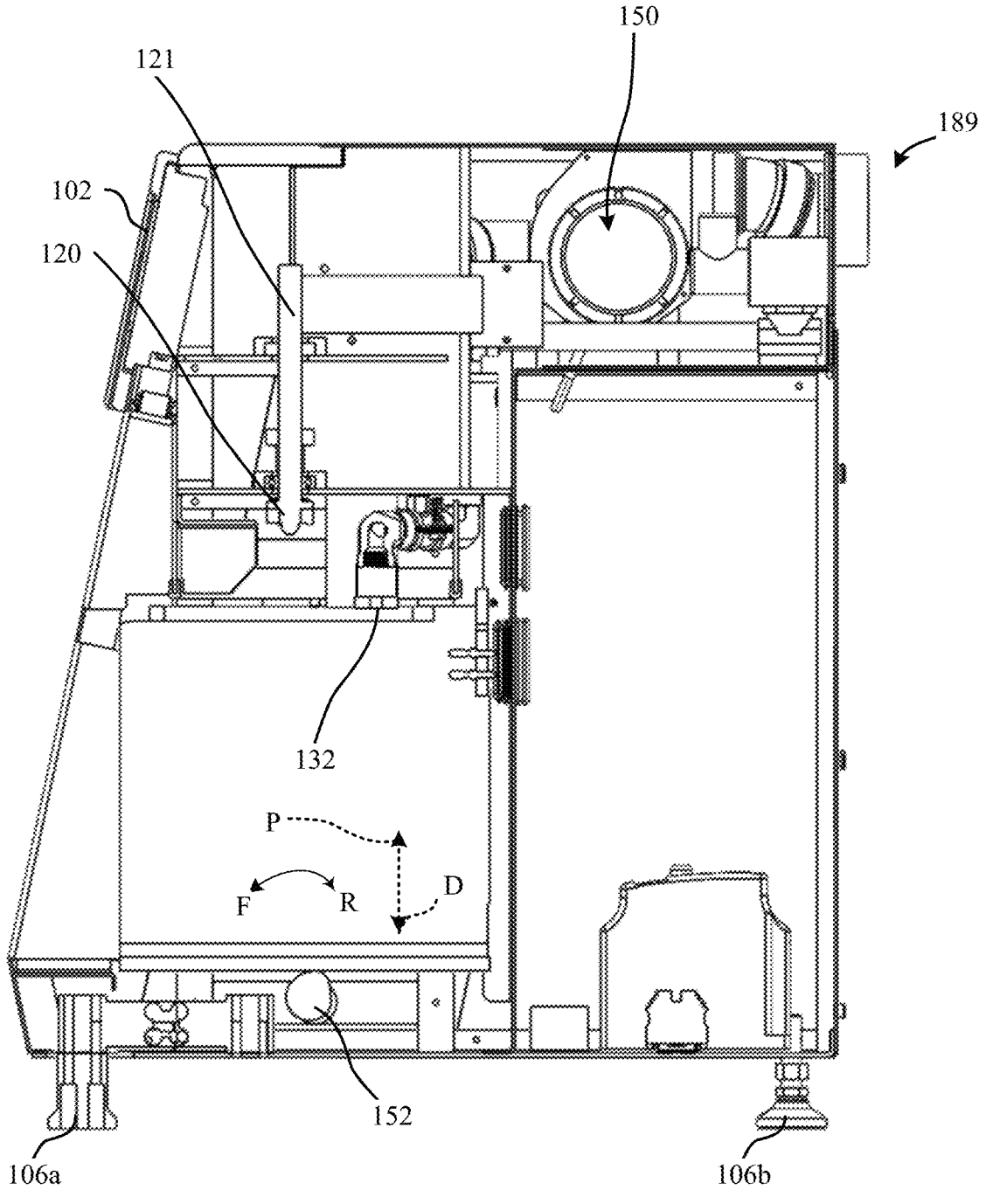
FIG. 7 is a right-side cross-section view of a cryogenic milling apparatus according to aspects of the disclosure.
Figure 9:
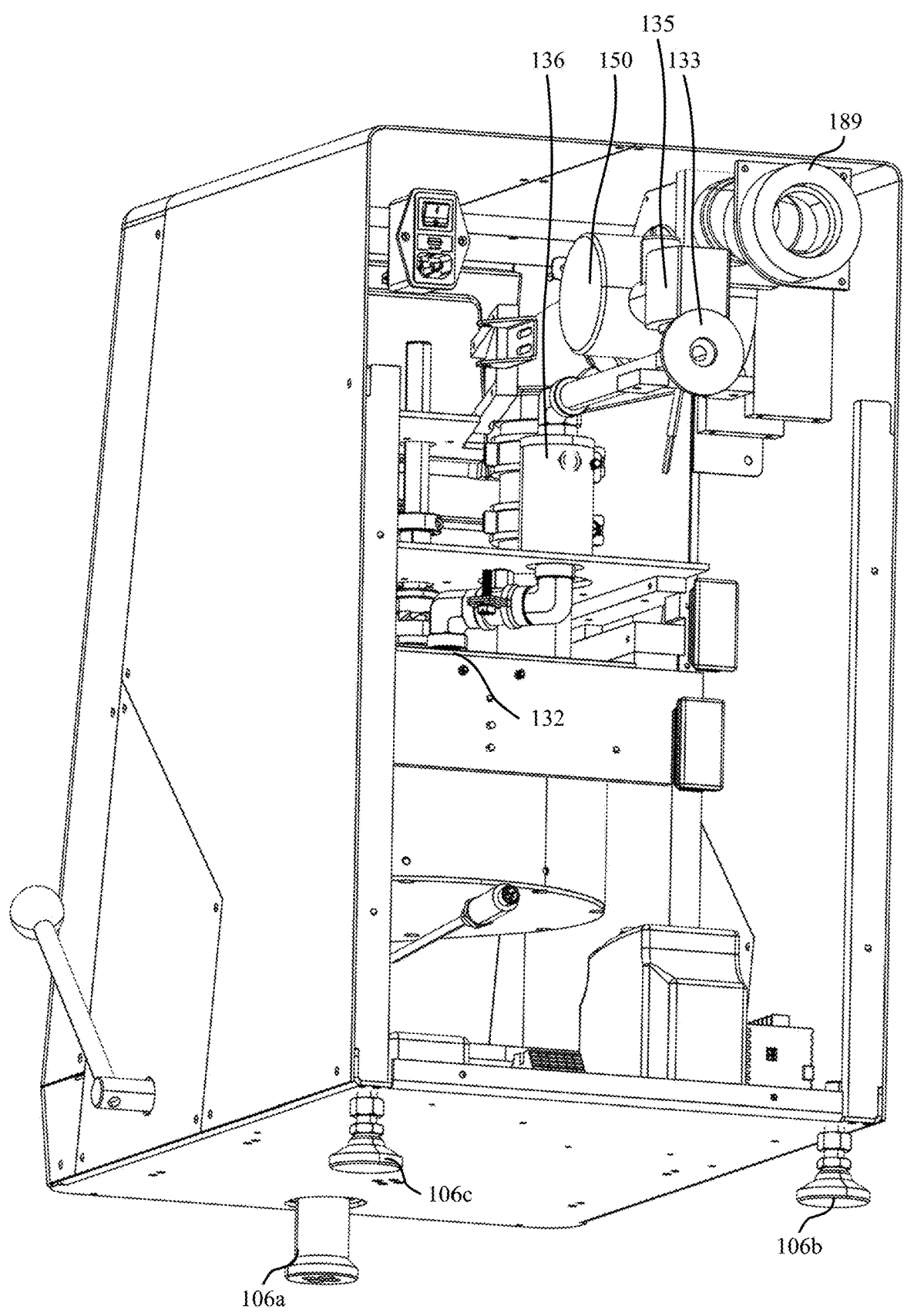
FIG. 9 is a rear partial cut-away view of a cryogenic milling apparatus according to aspects of the disclosure.

FIGS. 7-9 show additional views of main body 100 of an example cryogenic grinding system 50. FIG. 7 shows a cross-section of an example of the main body 100 with the sample containment vessel 200 removed. As mentioned above, pulling the engagement lever 110 (FIGS. 1A and 2) in direction F shown in FIG. 1A causes the containment vessel 200 to be engaged with or otherwise retainability held within an opening 101 of the main body 100. In one example, the rotating the engagement lever may cause activation of an engagement system. For example, rotating the engagement lever 110 in direction F may cause one or more pressing members to press upward in an P direction (See FIGS. 1A and 7), the pressing members may press upward, thus pressing the rails 210*a* and 210*b* against the top of each respective track 112*a* and 112*b* of the main body 100 and applying a clamping force to the sample containment vessel 200. The pressing member may for example comprise one or more cams 152 that are rotatably mounted in the main body 100. The one or more cams 152, may have a cam profile that increases in radius. The cam profile may be in contact with one or more slidably mounted force transition members (e.g., force transition member 182 shown in FIG. 2). It is noted that while only a single force transition member 182 labeled in FIG. 2, a similar or identical force transition member (hidden from view) may be present on the opposite side of the main body 100, within the opening 101. The increase in cam profile radius may cause the one or more slideably mounted force transition member(s) 182 translate upwards in direction P, thus causing the pressing members to press upward, pressing the rails 210*a* and 210*b* (FIG. 2) against the top of each respective track 112*a* and 112*b* of the main body 100 and applying a clamping force to the sample containment vessel 200 to seal the top section 200*a* to the bottom section 200*b* and/or to seal the supply door 217 with the flange 242, for example. The aforementioned steps may be reversed to release the sample containment vessel 200 from the main body 100. For example, rotating the engagement lever 110 opposite direction F, causes the one or more cams 152 to rotate in direction R, so that a reduced radius section of the cam contacts the force transition member(s) 182, thus causing the force transition member(s) 182 to retract in direction D and reducing or removing the upward force applied to the rails 210*a* and 210*b*. The retraction may cause the sample containment vessel 200 to move downward in direction D with respect to the main body 100, which may cause the blade driving coupler 220 to disengage from the driving coupler 120, the exhaust port 234 to be separated from the exhaust duct 134 and/or the cryogen supply port 232 to be separated from the cryogen supply 132. Once the blade driving coupler 120 is disengaged from the driving coupler 220, the exhaust port 234 is separated from the exhaust duct 134, and the cryogen supply port 232 is separated from the cryogen supply 132, the sample containment vessel 200 may be slid out of the main body 100 as shown in FIG. 2.

In addition to the aforementioned features, the sample containment vessel 200 may include one or more thermistor or temperature sensor ports 299*a* (FIG. 5A) or 299*b* (FIG. 6A). In one example, the one or more thermistor or temperature sensor ports 299*a* and/or 299*b* may be configured to slidably receive one or more temperature sensors or thermistors. In the example shown in FIG. 6A, two or more ports may be formed in the side of the sample containment vessel 200, so that when the rails 210*a* and 210*b* of the sample containment vessel 200 are slid into the main body 100 via tracks 112*a* and 112*b* and the engagement lever 110 is rotated as mentioned above, one or more thermistor (e.g., thermistor 199) of the main body 100 come into contact a surface of the inner wall (e.g., the inner wall 252) of the sample containment vessel 200 so as to form a thermal path between the inner wall 252 and a thermistor 199 allowing the control system (described in further detail below) to determine a temperature within the sample containment vessel 200. In one aspect usable with or instead of the aforementioned configuration, the sample containment vessel 200 may have a thermistor opening 299*b*. The thermistor opening may operate similarly as the configuration above, but instead the thermal contact between a thermistor and the inner wall of the sample containment vessel 200 may instead occur at the bottom of the sample containment vessel 200.

In yet another aspect, that may be used instead of or in combination with any one of or both of the aforementioned configurations, the thermistor or other temperature sensor or a plurality of thermistors or temperature sensors may be part of the sample containment vessel 200 (e.g., mounted to any inner wall of the sample containment vessel 200). The thermistor 199 referenced above and shown in FIG. 6A may instead be an electrical contact portion that provides an electrical contact between the main body 100 and the thermistor or temperature sensor(s) of the sample containment vessel 200.

As mentioned above, the driving coupler 120 may be configured to rotate in at least one of two directions and may be configured to provide rotational force to the blade(s) within the sample containment vessel 200 after being coupled to the blade driving coupler 220. The driving coupler 120 may be rotatably supported within the main body 100 via blade driving shaft 121. The blade driving shaft 121 may be rotatably supported via bushings, bearings, or a combination thereof. As best shown in FIG. 8, the driving shaft 121 may be mechanically or otherwise operably connected to a motor 172 of the main body 100. Some examples of a mechanical or operative connection between the motor 172 and the blade driving shaft 121 may include a belt or chain drive, a geartrain, or in an alternative configuration, the motor may be directly coupled to the blade driving shaft 121.

As shown in FIG. 8, the exhaust duct 134 may be in fluid communication with a blower or vent apparatus 150. The vent apparatus 150 may be configured to pull gas from the exhaust duct 134 and to an exit opening 189. The exit opening 189 may be configured to be left open to the surrounding atmosphere or may be configured to have an additional duct or tube connected thereto for expelling fluid (e.g., gas) produced during the processing of a sample contained within the sample containment vessel 200. The blower or vent apparatus 150 may be any suitable electric blower or fan known in the art. As described in further detail below, the blower or vent may be provided power by, or otherwise operated by a controller.

As best shown in FIG. 9, the main body 100 cryogen supply 132 may be fluidly connected to a cryogen input 133. The cryogen input 133 may include an electronically or hydraulically controlled valve 135 for controlling the supply of a cryogen to the cryogen supply port 232 of the sample containment vessel 200 via the cryogen supply 132. As discussed in further detail below the electronically or hydraulically controlled valve 135 may be controlled or otherwise powered by a controller. The cryogen supply may for example be insulated (e.g., via insulation 136). The insulation 136 may prevent condensation accumulation due to the cryogen supply having a temperature lower than the dewpoint of the surrounding environment. It is noted that while only partial insulation is shown in FIG. 9 to prevent obstruction of the view, the entire cryogen conduit/pipe may be insulated. The cryogen input 133 may for example be configured to be connected to a cryogen source, such as a liquid nitrogen source. The cryogen input 133 may for example be a standard connector (e.g., an American National Pipe Tapered Thread "NPT" type ⅜ connector).

Figure 10:
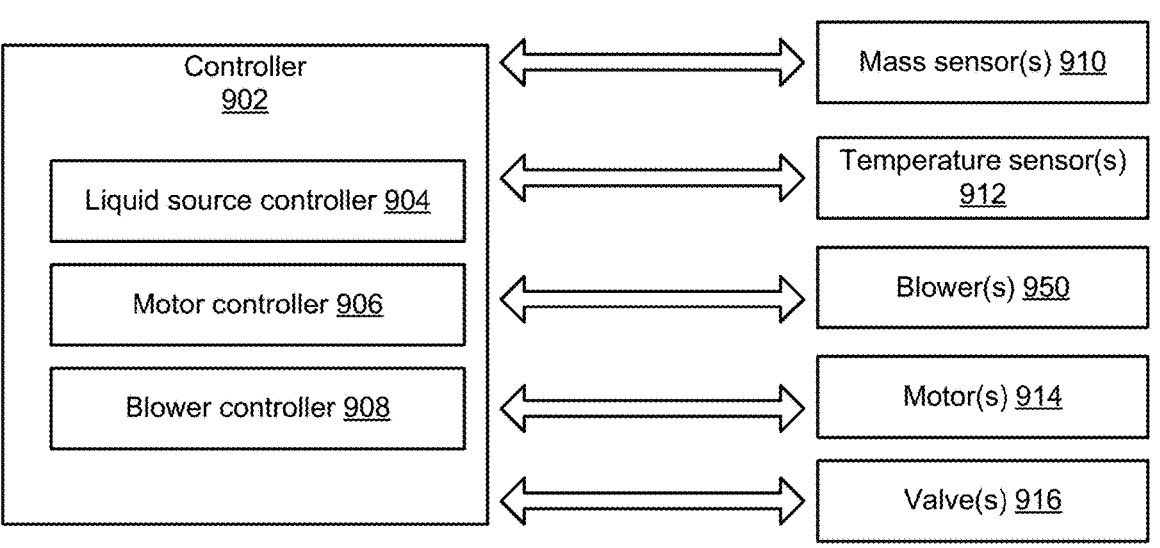
FIG. 10 illustrates a diagram of a control aspect of a cryogenic milling apparatus according to aspects of the disclosure.

FIG. 10 shows one example of a controller or control structure usable with the current disclosure. As an example, the controller may for example include a liquid source control component, a motor control component and a blade control component. The controller may for example be in signal communication with any one or a combination of the mass sensor(s) 910, temperature sensor(s) 912, blower 950, motor 914, and/or valve 916. In one example the mass sensor(s) 910 may be analogous with the mass sensor or mass cell 106*a* (FIGS. 1A, 2, 5A, 6A, 7, 8, and 9), the temperature sensor(s) 912 may be analogous with the thermistor 199 (FIG. 6A), the blower 950 may be analogous with the blower or vent apparatus 150 (FIGS. 5A, 6A, 7, 8, and 9), the motor 914 may be analogous with the motor 172 (FIG. 8), and the valve 916 may be analogous with the electronically or hydraulically controlled valve 135 (FIG. 9).

In one example operation of the controller, once it is determined that a sample is placed into the sample containment vessel 200 and the sample containment vessel 200 is placed into the main body 100. A user may indicate that the sample is to be processed via the display interface 102. For example, the display interface 102 may for example have a graphical user interface (GUI) with an icon or other visual indicator, and a controller may determine that a user has touched or pressed the icon or other visual indicator signifying that the user wishes to process the sample. It is noted that while throughout the disclosure a GUI is referenced as providing both indicators to a user and for allowing a user the control or enter inputs into the device, in another aspect, a user may provide instructions via switches knobs.

Further, instead of a screen, lights or other indicators may be used to indicate a state of the device to a user.

Once the determination is made that the container is placed in the main body 100 and the engagement lever 110 is rotated to the locked position, the controller may provide a current or a signal to the valve 916 to provide a cryogen to the sample containment vessel 200. In one example, a user may input any one or a combination of a weight, volume, or type of sample that is in the sample containment vessel 200 and the controller determine volume of cryogen to be supplied to the sample containment vessel 200 based on any one or a combination of a weight, volume, or type of sample inputted by a user. In another example, the controller may determine the weight of the sample placed in the sample containment vessel 200 based on an output from the mass sensor(s) 910, and may either automatically supply an appropriate volume of cryogen and/or may suggest an appropriate volume of cryogen to the container via the display interface 102. The GUI may then be controlled to request confirmation from a user and/or an override option may be provided allowing a user to add or subtract a volume of cryogen from the suggested amount. In yet another example, the system may automatically supply a set volume of cryogen once a user indicates that the sample is to be processed. In any one or a combination of the aforementioned examples, an initial volume of cryogen may be between 70-300 milliliters (ml). In yet another example, the initial volume of cryogen may be between 100-150 ml. In one preferred aspect, the initial volume of cryogen may be between 140-150 ml. In yet another preferred aspect, the initial volume of cryogen may be between 185-210 ml. In one example, the controller may set an initial volume of cryogen provided to the sample containment vessel sample containment vessel 200 via the valve 916 to be approximately 200 ml. In one example, the controller may use the output from the mass sensor(s) to determine when to open/close the valve 916 when an appropriate volume of cryogen has been added to the sample containment vessel 200.

In one example operation of the controller that is usable with the aforementioned aspects, once an appropriate amount of cryogen, or more preferably as the cryogen is being added to the sample containment vessel 200, the controller may operate the motor 914 to rotate the blade(s) (e.g., blade 204(*b*) in FIG. 4B and/or blades 204*a* in FIG. 1B). In one preferred example, the blade may be controlled to rotate in a first direction and then rotate in a second reverse direction in a "pulsing" motion as the cryogen is added to the sample containment vessel 200. By alternating the direction of the blade as described above, a more uniform treatment of the sample with the cryogen may occur and sticking of the sample to the blade may be reduced. Once the desired volume of cryogen is added, the controller may pause rotation of the blade to allow the cryogen to remove heat from the sample and reduce the temperature of the sample to a desired temperature. The controller may determine if a temperature of the sample has decreased to a desirable temperature by monitoring the output of the temperature sensor(s) 912. Once the controller determines that the temperature of the sample has decreased to a desired temperature, the motor may again be powered to grind or otherwise reduce the particle size of the sample in the sample containment vessel 200. In one example, the GUI displayed on the display interface 102 may indicate the temperature of the sample within the sample containment vessel 200. In one aspect, the GUI may include an indicator or section allowing a user to either override the desired temperature of the sample, and/or to set a desired temperature before the motor is again controlled to rotate the blades so additional grinding or reduction of particle size of the sample occurs.

In one example, the temperature of the sample within the sample containment vessel 200 may be continually monitored. In the aforementioned example, an upper temperature and lower temperature may be set and the controller may supply additional cryogen if the temperature of the sample within the sample containment vessel 200 increases above, or fails to reduce below a threshold temperature. In one example, the cryogen may be liquid nitrogen with a boiling point of approximately −198 Degrees Celsius and the threshold temperature may be any value between −50 to −198 Degrees Celsius. In another example, the threshold temperature may be any value between −100 to −170 Degrees Celsius. In one preferred example, the threshold temperature may be −140 Degrees Celsius. Thus in the aforementioned example, if the controller determines that the temperature of the sample within the sample containment vessel 200 is above −140 Degrees Celsius, the valve 916 is controlled to provide additional liquid nitrogen to the sample containment vessel 200 until the temperature is determined to have decreased to at least 140 Degrees Celsius. While the aforementioned example provides advantages, it is noted that any temperature or range of temperatures (especially within the aforementioned ranges) may serve as the threshold temperatures.

In any of the aforementioned examples, the controller may further control a blower(s) 950. The blower may for example be controlled to remove gas that builds up within the sample containment vessel 200 as the cryogen boils. In some examples the controller may power one the blower anytime a cryogen is present in the sample containment vessel 200. In another example, the controller may power on the blower when it is determined that the temperature within the sample containment vessel 200 has fallen below a certain temperature. For example, if a desired or optimal temperature range of the sample is set or provided, the blower may be powered on if the temperature of the sample in the sample containment vessel 200 comes close to or decreases below the desire temperature range.

In another example, the motor speed and thus the blade speed may be controlled based on any one or a combination of the aforementioned determinations. For example, a blade speed may be controlled to be slower when the detected temperature is above a threshold temperature and may then be controlled to increase as the temperature decreases below the threshold temperature. In another example the blade speed may be controlled to be lower for a first period after the user indicates that the sample in the sample containment vessel 200 is to be processed and may then be controlled to increase to a higher speed in a second period after the first period.

It is noted that the aforementioned operations are provided as examples. While some specific examples are given, one having ordinary skill in the art would understand that additional possibilities of automated, semi-automated, or manual control of the systems and devices of the disclosed cryogenic grinding apparatus would fall within the scope of this disclosure after understanding the disclosure provided herein.

Figure 11:
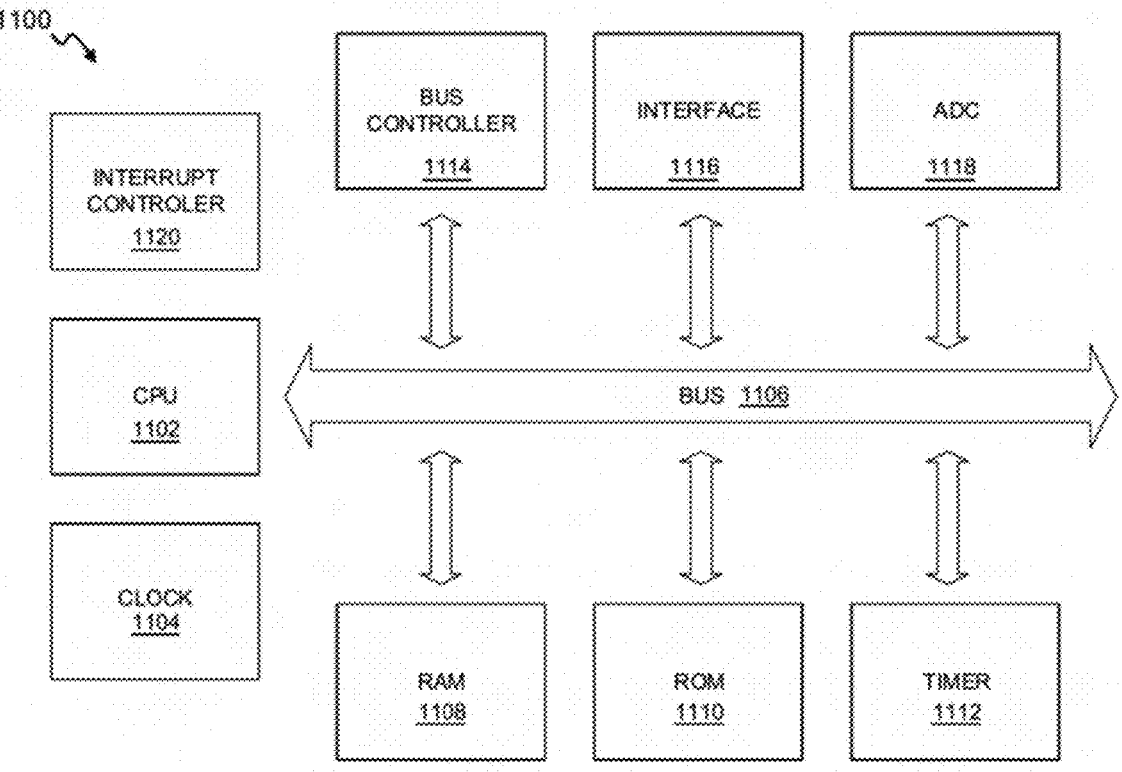
FIG. 11 illustrates an example representative diagram of various components of an example controller usable with aspects of the disclosure.

In some implementations, as part of or incorporating various features and methods described herein, one or more microcontrollers may be implemented (e.g., in any one or a combination of controller 902, liquid source controller 904, motor controller 906, and/or blower controller 908) for carrying out various operations in accordance with aspects of the present invention. Various components of such a controller 1100 are shown in representative block diagram form in FIG. 11. In FIG. 11, the controller 1100 includes a CPU 1102, clock 1104, RAM 1108, ROM 1110, a timer 1112, a BUS controller 1114, an interface 1116, and an analog-to-digital converter (ADC) 1118 interconnected via a BUS 1106.

The CPU 1102 may be implemented as one or more single core or multi-core processors, and receive signals from an interrupt controller 1120 and a clock 1104. The clock 1104 may set the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU, to suspend CPU operations. The interrupt controller 1120 may transmit an interrupt signal to the CPU when an event requires immediate CPU attention.

The RAM 1108 may include one or more Static Random Access Memory (SRAM), Dynamic Random Access Memory (DRAM), Synchronous Dynamic Random Access Memory (SDRAM), Double Data-Rate Random Access Memory (DDR SDRAM), or other suitable volatile memory. The Read-only Memory (ROM) 1110 may include one or more Programmable Read-only Memory (PROM), Erasable Programmable Read-only Memory (EPROM), Electronically Erasable Programmable Read-only memory (EE-PROM), flash memory, or other types of non-volatile memory.

The timer 1112 may keep time and/or calculate the amount of time between events occurring within the controller 1100, count the number of events, and/or generate baud rate for communication transfer. The BUS controller 1114 may prioritize BUS usage within the controller 1100. The ADC 1118 may allow the controller 1100 to send out pulses to signal other devices.

The interface 1116 may comprise an input/output device that allows the controller 1100 to exchange information with other devices. In some implementations, the interface 1116 may include one or more of a parallel port, a serial port, or other computer interfaces.

Figure 12:
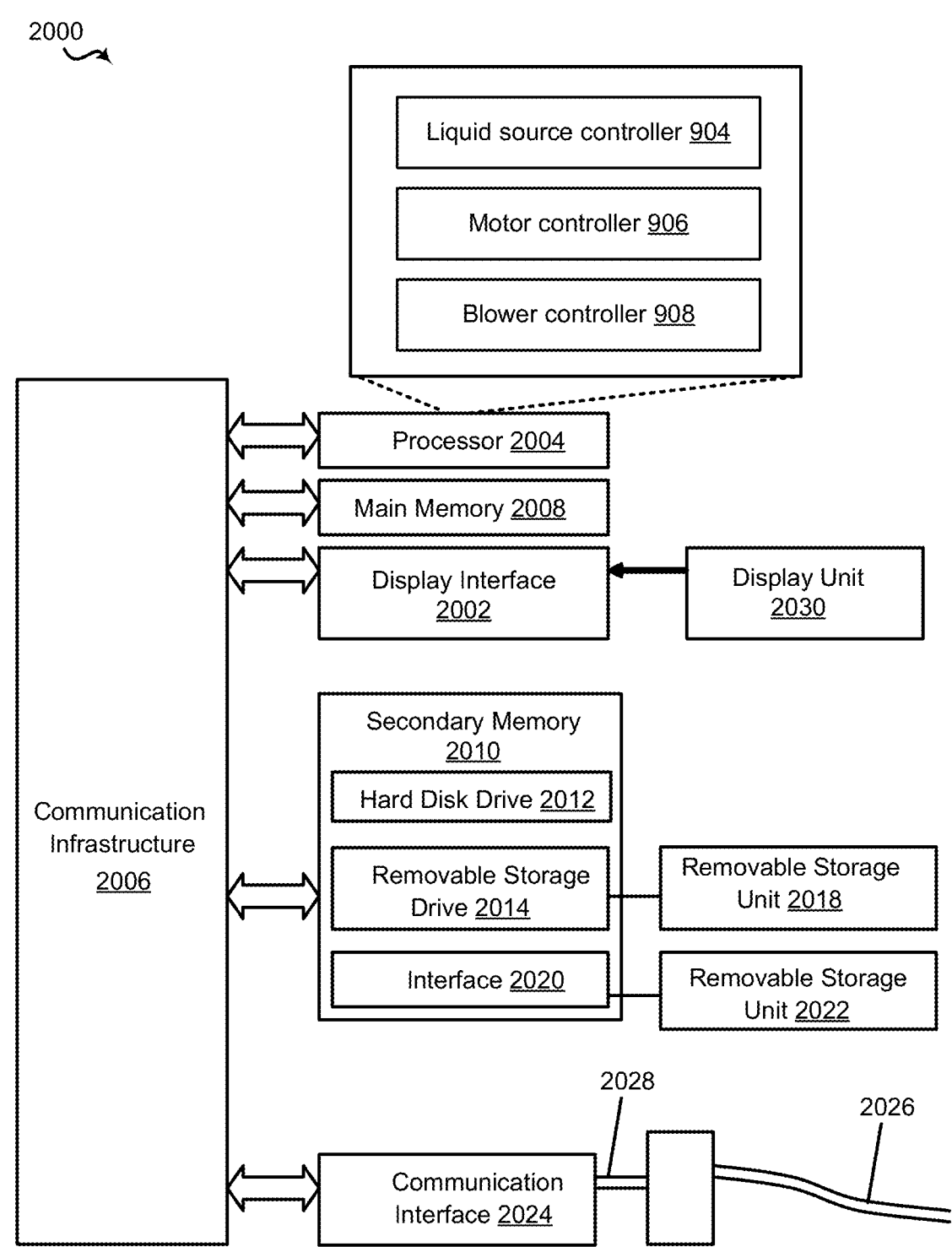
FIG. 12 illustrates an example of a computer system in accordance with aspects of the disclosure.

In addition, aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 2000 is shown in FIG. 12.

The computer system 2000 may include one or more processors, such as processor 2004. The processor 2004 may be connected to a communication infrastructure 2006 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030, which may be analogous with the display interface 102. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data.

Alternative aspects of the present disclosure may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and other removable storage units 2022 and interfaces 2020, which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a Personal Computer Memory Card International Association (PCMCIA) slot and card, etc. Software and data transferred via communications interface 2024 are in the form of signals 2028, which may be electronic, electromagnetic, optical or other signals capable of being received by communications interface 2024. These signals 2028 are provided to communications interface 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as a removable storage drive 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications interface 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard drive 2012, or communications interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

FIG. 12 is a block diagram of various example communication system components usable in accordance with an aspect of the present disclosure. The communication system 2100 includes one or more accessors 2160, 2162 (which may for example comprise any of the aforementioned systems and features) and one or more terminals 2142, 2166. In one aspect, data for use in accordance with aspects of the present disclosure is, for example, input and/or accessed by accessors 2160, 2162 via terminals 2142, 2166, such as personal computers (PCs), minicomputers, mainframe computers, microcomputers, telephonic devices, or wireless devices, such as personal digital assistants ("PDAs") or a hand-held wireless devices coupled to a server 2143, such as a PC, minicomputer, mainframe computer, microcomputer, or other device having a processor and a repository for data and/or connection to a repository for data, via, for example, a network 2144, such as the Internet or an intranet, and couplings 2145, 2146, 2164. The couplings 2145, 2146, 2164 include, for example, wired, wireless, or fiberoptic links. In another example variation, the method and system in accordance with aspects of the present disclosure operate in a stand-alone environment, such as on a single terminal.

This written description uses examples to disclose aspects of the invention, including the preferred embodiments, and also to enable any person skilled in the art to practice the aspects thereof, including making and using any devices or systems and performing any incorporated methods. The patentable scope of these aspects is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

IV. Example Implementations

The following clauses include example implementations of the aspects described herein.

Clause 1. A cryogenic grinding system for processing a sample, the system comprising: a cryogen source; a containment vessel for containing the sample and the cryogen; a blade for grinding the sample; and a controller configured to control at least one of: a quantity of cryogen introduced into the container; a grinding duration of the at least one blade; or a grinding speed of the at least one blade based on at least one of: a user input via a grinding system input, a mass of the sample placed in the containment vessel; or a temperature within the containment vessel.

Clause 2. The system of clause 1, wherein the cryogen source is liquid nitrogen.

Clause 3. The system of clause 1 and/or clause 2, wherein the controller controls the quantity of the cryogen based on a signal indicating the mass of the sample placed in the containment vessel.

Clause 4. The system of any of the above clauses, wherein the signal is an output of a mass cell.

Clause 5. The system of any of the above clauses, wherein the signal is based on a user input via the grinding system input.

Clause 6. The system any of the above clauses, wherein the cryogen source is a valve configured to be placed in fluid communication with a cryogen tank.

Clause 7. The system of any of the above clauses, wherein the cryogen source is a cryogen tank.

Clause 8. The system of any of the above clauses, wherein the containment vessel is slideably removeable from a main body of the system.

Clause 9. The system of any of the above clauses, wherein containment vessel is removable from a main body of the system, wherein the system further comprises an engagement lever, wherein user engagement of the lever causes operative coupling of a motor to the blade.

Clause 10. The system of any of the above clauses, wherein the quantity the cryogen introduced into the container is controlled via a valve.

Clause 11. The system of any of the above clauses, wherein the quantity of the cryogen introduced into the container is increased or decreased based on a temperature within the containment vessel.

Clause 12. The system of any of the above clauses, wherein the quantity of the cryogen introduced into the container is increased or decreased based on a user input via the grinding system input.

Clause 13. The system of any of the above clauses, wherein the quantity of the cryogen introduced into the container is controlled based on a mass of the sample.

Clause 14. The system of any of the above clauses, wherein the mass of the sample is determined via a mass cell.

Clause 15. A cryogenic grinding apparatus for processing a sample, the apparatus comprising: a cryogen supply valve; an opening configured to receive a containment vessel for containing the sample; a blade driving apparatus; and a controller configured to control at least one of: a quantity of cryogen introduced into a vessel received within the opening; a rotating duration of the blade driving apparatus; a speed of the of the blade driving apparatus based on at least one of: a user input via a grinding system input, a detected mass of the sample in a containment vessel placed in the opening; or a temperature within the containment vessel placed in the opening.

Clause 16. The apparatus of clause 15, wherein liquid nitrogen is supplied to the cryogen supply valve.

Clause 17. The apparatus of clause 15 and/or clause 16, wherein the controller controls the quantity of the cryogen supplied to a containment vessel placed in the opening based on a signal indicating the mass of a sample within in the containment vessel.

Clause 18. The apparatus of any of the above clauses, wherein the signal is an output of a mass cell.

Clause 19. The of any of the above clauses, wherein the signal is based on a user input via the grinding system input.

Clause 20. The apparatus of any of the above clauses, wherein a containment vessel is slidably insertable or removeable from the cryogenic grinding apparatus.

Clause 21. A cryogenic grinding apparatus for processing a sample within a containment vessel, the apparatus comprising: an opening configured to receive the containment vessel; and an engagement system, wherein when the containment vessel is placed into the opening, the engagement system is configured to engage at least one of: a driving coupler with a blade driving coupler of the containment vessel; a cryogen supply with a cryogen supply port of the containment vessel; or an exhaust duct with an exhaust port of the containment vessel.

Clause 22. The apparatus of clause 21, wherein the engagement system is configured to move the containment vessel from an engaged configuration to a disengaged configuration.

Clause 23. The cryogenic grinding apparatus of clause 21 and/or 22, wherein the engagement system is configured to clamp shut a sample receiving opening of the containment vessel.

What is claimed is:

1. A cryogenic grinding system for processing a sample, the system comprising:
   a cryogen source;
   a containment vessel for containing the sample and a cryogen;
   at least one blade within the containment vessel for grinding the sample; and
   a controller configured to control at least one of: a quantity of cryogen introduced into the containment vessel; a grinding duration of the at least one blade; or a grinding speed of the at least one blade based on at least one of: a user input via a grinding system input, a mass of the sample placed in the containment vessel; or a temperature within the containment vessel; and
   wherein the controller controls the quantity of the cryogen introduced in the containment vessel based on a mass of the sample.

2. The system of claim 1, wherein the cryogen source is liquid nitrogen.

3. The system of claim 1, wherein the controller determines the mass of the sample based on a signal indicating the mass of the sample placed in the containment vessel.

4. The system of claim 3, wherein the signal is an output of a mass cell.

5. The system of claim 3, wherein the signal is based on a user input via the grinding system input.

6. The system of claim 1, wherein the cryogen source is a valve configured to be placed in fluid communication with a cryogen tank.

7. The system of claim 1, wherein the cryogen source is a cryogen tank.

8. The system of claim 1, wherein the containment vessel is slideably removeable from a main body of the system.

9. The system of claim 1, wherein containment vessel is removable from a main body of the system, wherein the system further comprises an engagement lever, wherein user engagement of the lever causes operative coupling of a motor to the at least one blade.

10. The system of claim 1, wherein the quantity the cryogen introduced into the container is controlled via a valve.

11. The system of claim 10, wherein the quantity of the cryogen introduced into the container is increased or decreased based on a temperature within the containment vessel.

12. The system of claim 10, wherein the quantity of the cryogen introduced into the container is increased or decreased based on a user input via the grinding system input.

13. The system of claim 1, wherein the mass of the sample is determined via a mass cell.

14. A cryogenic grinding apparatus for processing a sample, the apparatus comprising:

a cryogen supply valve;

an opening configured to receive a containment vessel for containing the sample;

a blade driving apparatus; and a controller configured to control at least one of: a quantity of cryogen introduced into a vessel received within the opening; a rotating duration of the blade driving apparatus; a speed of the of the blade driving apparatus based on at least one of: a user input via a grinding system input, a detected mass of the sample in a containment vessel placed in the opening; or a temperature within the containment vessel placed in the opening; and wherein the controller controls the quantity of the cryogen supplied to the containment vessel placed in the opening based on a determined mass of the sample within the containment vessel.

15. The apparatus of claim 14, wherein liquid nitrogen is supplied to the cryogen supply valve.

16. The apparatus of claim 14, wherein the controller determines the mass of the sample based on a signal indicating the mass of a sample within in the containment vessel.

17. The apparatus of claim 16, wherein the signal is an output of a mass cell.

18. The apparatus of claim 16, wherein the signal is based on a user input via the grinding system input.

19. The apparatus of claim 14, wherein a containment vessel is slidably insertable or removeable from the cryogenic grinding apparatus.

\* \* \* \* \*